US012456852B2

(12) United States Patent
Hendrix et al.

(10) Patent No.: US 12,456,852 B2
(45) Date of Patent: Oct. 28, 2025

(54) HYBRID POWER FIBER ENCLOSURE

(71) Applicant: viaPhoton, Inc., Aurora, IL (US)

(72) Inventors: Walter Mark Hendrix, Richardson, TX (US); Syed Babar Abbas, Chicago, IL (US); Elizabeth Grace Dabdoub, Bartlett, IL (US)

( * ) Notice: Subject to any disclaimer, the term of this patent is extended or adjusted under 35 U.S.C. 154(b) by 577 days.

(21) Appl. No.: 17/591,169

(22) Filed: Feb. 2, 2022

(65) Prior Publication Data

US 2022/0155544 A1    May 19, 2022

Related U.S. Application Data

(63) Continuation-in-part of application No. 17/555,008, filed on Dec. 17, 2021, now Pat. No. 12,044,895, and a continuation-in-part of application No. 17/308,729, filed on May 5, 2021, now Pat. No. 11,531,178.

(60) Provisional application No. 63/251,390, filed on Oct. 1, 2021, provisional application No. 63/144,804, filed on Feb. 2, 2021, provisional application No. 63/127,379, filed on Dec. 18, 2020, provisional application No. 63/038,405, filed on Jun. 12, 2020, provisional application No. 63/021,562, filed on May 7, 2020.

(51) Int. Cl.
*H02G 3/08* (2006.01)
*G02B 6/44* (2006.01)

(52) U.S. Cl.
CPC ............ *H02G 3/086* (2013.01); *G02B 6/4448* (2013.01); *G02B 6/44524* (2023.05); *G02B 6/44528* (2023.05)

(58) Field of Classification Search
CPC ................ G02B 6/4448; G02B 6/4455; G02B 6/44524; G02B 6/44528; G02B 6/4417; H02G 3/08–20; H02G 3/086
See application file for complete search history.

(56) References Cited

U.S. PATENT DOCUMENTS

| | | | |
|---|---|---|---|
| 7,653,282 B2 | 1/2010 | Blackwell, Jr. et al. | |
| 8,805,153 B2* | 8/2014 | Rudenick | F16L 3/18 |
| | | | 29/832 |
| 9,099,860 B2* | 8/2015 | Martinez | H02H 9/04 |
| 10,911,928 B2† | 2/2021 | Zhang | |
| 11,971,596 B2* | 4/2024 | Thomas | H02G 3/16 |
| 2006/0153362 A1* | 7/2006 | Bloodworth | G02B 6/4448 |
| | | | 379/413.02 |

* cited by examiner
† cited by third party

*Primary Examiner* — John Bedtelyon
(74) *Attorney, Agent, or Firm* — Ferguson Braswell Fraser Kubasta PC (57) ABSTRACT

A hybrid enclosure embodies a hybrid power fiber enclosure. The hybrid enclosure includes a power distribution area, within the hybrid enclosure, configured to distribute one or more power cables. The hybrid enclosure further includes a fiber tray with a fiber access area configured to distribute one or more optical cables. The fiber tray, when in a closed position within the hybrid enclosure, prevents access to at least a portion of the power distribution area.

20 Claims, 11 Drawing Sheets

FIG. 6B

HYBRID POWER FIBER ENCLOSURE

CROSS-REFERENCE TO RELATED APPLICATIONS

This application is a continuation in part of U.S. application Ser. No. 17/308,729, filed May 5, 2021; is a continuation in part of U.S. application Ser. No. 17/555,008, filed Dec. 17, 2021; and claims the benefit of U.S. Provisional Application 63/144,804, filed Feb. 2, 2021. U.S. application Ser. No. 17/308,729 claims the benefit of U.S. Provisional Application 63/021,562, filed May 7, 2020; and claims the benefit U.S. Provisional Application 63/038,405, filed Jun. 12, 2020. U.S. application Ser. No. 17/555,008 claims the benefit of U.S. Provisional Application 63/251,390, filed Oct. 1, 2021; and claims the benefit of U.S. Provisional Application 63/127,379, filed Dec. 18, 2020. The applications identified above are herein incorporated by reference.

BACKGROUND

Communication cables may be mounted into standard sized enclosures. A challenge is to provide access to different areas and cables within an enclosure.

SUMMARY

In general, in one or more aspects, the disclosure relates to a hybrid enclosure that embodies a hybrid power fiber enclosure. The hybrid enclosure includes a power distribution area, within the hybrid enclosure, configured to distribute one or more power cables. The hybrid enclosure further includes a fiber tray with a fiber access area configured to distribute one or more optical cables. The fiber tray, when in a closed position within the hybrid enclosure, prevents access to at least a portion of the power distribution area.

In general, in one or more aspects, the disclosure relates to a method. The method includes distributing one or more power cables within a power distribution area within a hybrid enclosure. The method further includes distributing one or more optical cables in a fiber tray, of the hybrid enclosure, that includes a fiber access area. The fiber tray, when in a closed position within the hybrid enclosure, prevents access to at least a portion of the power distribution area.

In general, in one or more aspects, the disclosure relates to a hybrid enclosure. The hybrid enclosure includes a power distribution area, within the hybrid enclosure, configured to distribute one or more power cables. The hybrid enclosure further includes a fiber tray, of the hybrid enclosure, that has a fiber access area configured to distribute one or more optical cables. The fiber tray, when in a closed position within the hybrid enclosure, prevents access to at least a portion of the power distribution area. The hybrid enclosure further includes a connector connected between the fiber tray and the hybrid enclosure to provide restricted movement of the fiber tray out of the hybrid enclosure while retaining a length of the optical cables within the hybrid enclosure.

Other aspects of the invention will be apparent from the following description and the appended claims.

DETAILED DESCRIPTION

Specific embodiments will now be described in detail with reference to the accompanying figures. Like elements in the figures are denoted by like reference numerals for consistency.

In the following detailed description, numerous specific details are set forth in order to provide a more thorough understanding of the disclosure. However, it will be apparent to one of ordinary skill in the art that the disclosed embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure implement hybrid power fiber enclosures that provide access to different areas and cables within the enclosure. Embodiments provide a fiber tray defining a fiber access area that may be moved or rotated out of the enclosure to expose a power distribution area. The enclosure receives cables that include power cables and data cables that may be routed through the power distribution area and the fiber access area.

Hybrid enclosures (also referred to as hybrid fiber access panels) receive fiber and power cables and distribute the fiber and power to the components of a system. As an example, a hybrid enclosure for a cell tower distributes the power to the cell site tower mounted radios and distributes the fibers to the data components that are mounted to the tower.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of fiber and cable enclosures. The various elements, systems, components, and steps shown in the figures may be omitted, repeated, combined, and/or altered as shown from the figures. Accordingly, the scope of the present disclosure should not be considered limited to the specific arrangements shown in the figures.

Figure 1:
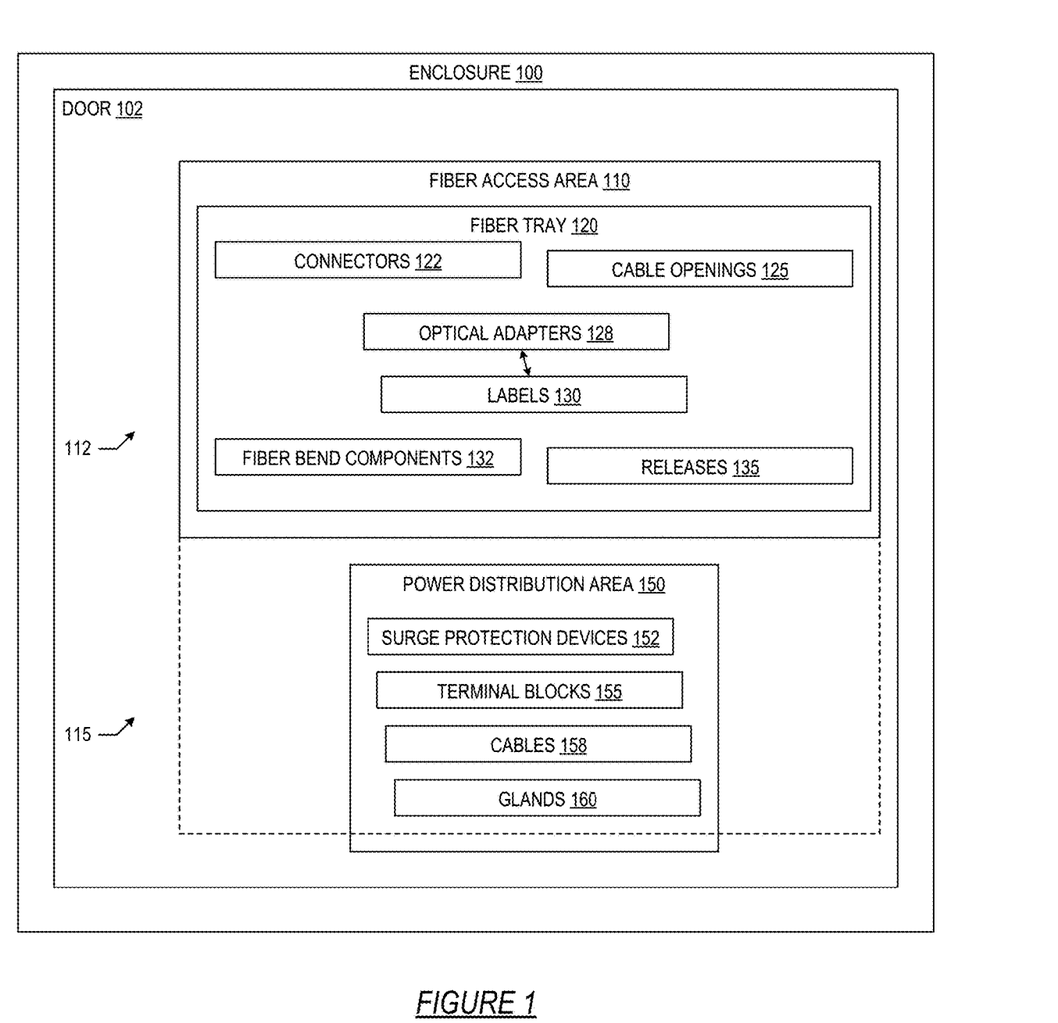
FIG. 1 shows a diagram of embodiments in accordance with disclosed embodiments.

Turning to FIG. 1, the enclosure (100) is an embodiment of a hybrid power fiber enclosure. The enclosure (100) routes, supports, and connects multiple power cables and data cables. The enclosure (100) may be made from rigid materials, including plastic, metal, etc. The enclosure (100) includes the door (102), the fiber access area (110), and the power distribution area (150).

The door (102) is a front covering for the closure (100). The door (102) covers the fiber access area (110). The door (102) protects the components in the fiber access area (110) and the power distribution area (150) from outdoor conditions, including rain and debris.

The fiber access area (110) includes, and may be defined by, the fiber tray (120). The fiber access area (110) is an area of the enclosure (100) to route optical cables (of the cables (158)) through the optical adapters (128).

The fiber tray (120) supports the components and the portions of the cables (158) in the fiber access area (110). The fiber tray (120) is movably attached to the enclosure (100) with the connectors (122). In one embodiment, the fiber tray (120) may be rotated or flipped up with respect to the enclosure (100) to reveal the power distribution area (150). The fiber tray (120) may be moved between the open position (112) and the closed position (115).

The open position (112) of the fiber tray (120) is a position of the fiber tray (120) in which the fiber tray (120) does not prevent access to the power distribution area (150). In one embodiment, the fiber tray (120) is rotated (e.g., flipped up) from the closed position (115) to the open position (112) through the connectors (122) (e.g., a hinge) connecting the fiber tray (120) to the enclosure (100). In the open position, the fiber tray (120) may extend out from the enclosure (100).

The closed position (115) of the fiber tray (120) is a position of the fiber tray (120) in which the fiber tray prevents access to the power distribution area (150) of the enclosure (100). In one embodiment, the fiber tray (120) is rotated (e.g., flipped down) from the open position (112) to the closed position (115) through the connectors (122). When the fiber tray (120) is in the closed position (115), the fiber tray (120) may cover at least a portion of the power distribution area (150) preventing access thereto.

The connectors (122) connect the fiber tray (120) to the enclosure (100). In one embodiment, the connectors (122) include a hinge that provides for rotation of the fiber tree (120) with respect to the enclosure (100). The connectors (122) may be positioned at a proximal side of the enclosure (100). In one embodiment, the hinge is a friction hinge that resists movement of the fiber tray (120) to hold the fiber tray in place in the open position (112) and allow access to the power distribution area (150).

The cable openings (125) are openings in the fiber tray (120) through which sets of cables (of the cables (158)) may pass from the power distribution area (150) to the fiber access area (110). The cable openings (125) may be positioned to a proximal side of the fiber tray (120) and of the enclosure (100) next to the connectors (122) to reduce the amount of travel and bend of the set of optical cables that extend from the power distribution area (150) to the fiber access area (110) through the cable openings (125).

The optical adapters (128) are optical components that couple cables together to allow data signals to pass from one cable to another through the optical coupler. In one embodiment, an optical fiber from a trunk cable (of the cables (158)) feeds into one end of an optical adapter with the opposite end of the optical adapter connected to an optical fiber from a component cable (of the cables (158)). The optical adapters (128) may correspond to the labels (130).

The labels (130) are human readable identifiers within the fiber tray (120). The labels (130) identify the optical fibers (of the cables (158)) that are connected to the optical adapters (128).

The fiber bend components (132) are mechanical structures within the fiber tray (120) around which optical fibers of the cables (158) may be wound or wrapped. The fiber bend components (132) are used to support the optical fibers within the fiber access area (110) and prevent the optical fibers from being bent past respective minimum bend radii of the optical fibers.

The releases (135) are components that restrict movement of the fiber tray (120). In one embodiment, when the fiber tray (120) is in the closed position (115), the release (135) may lock the fiber tray (120) to the closed position (115) and prevent movement to the open position (112). In one embodiment, the releases (135) are mechanical switches that, when released, enable movement of the fiber tray (120) from the closed position (115) to the open position (112).

The power distribution area (150) is an area within the enclosure (100) through which power cables (of the cables (158)) are routed. The power distribution area (150) may include the surge protection devices (152) and the terminal blocks (155).

The surge protection devices (152) are protective devices to limit transient electrical characteristics that may be experienced by the power cables of the cables (158). In one embodiment, the surge protection devices (152) limit voltages by diverting or limiting surge current. The surge protection devices (152) may conform to the ANSI/UL (1449) standard.

The terminal blocks (155) are modular blocks with insulated frames that may each secure two or more wires together. In one embodiment, the terminal blocks (155) are used to wire the power cables through the surge protection devices (152).

The cables (158) route power and data through the enclosure (100). The cables (158) include trunk cables and component cables.

The trunk cables and component cables include power cables and data cables. The power cables include electrical power cables, which may include direct current (DC) power cables and alternating current (AC) power cables. The power cables may use multiple power levels, voltage levels, current levels, etc. The data cables include optical cables that include optical fibers within the cables. The different data cables may use different data rates and light frequencies.

The glands (160) are mechanical cable entry devices designed to attach and secure the ends of electrical cables to the enclosure (100). The glands (160) provide strain-relief to the cables (158). In one embodiment, the glands (160) connect to the enclosure (100) using multiple threaded fasteners. The glands (160) allow for ingress and egress of the cables (158) to the enclosure (100) and may seal the enclosure (100) against outdoor conditions. The glands (160) are made of various plastics and metals, including steel, brass aluminum, etc. The glands (160) may resist dripping water and water pressure with synthetic rubber or other types of elastomer seals.

Figure 2:
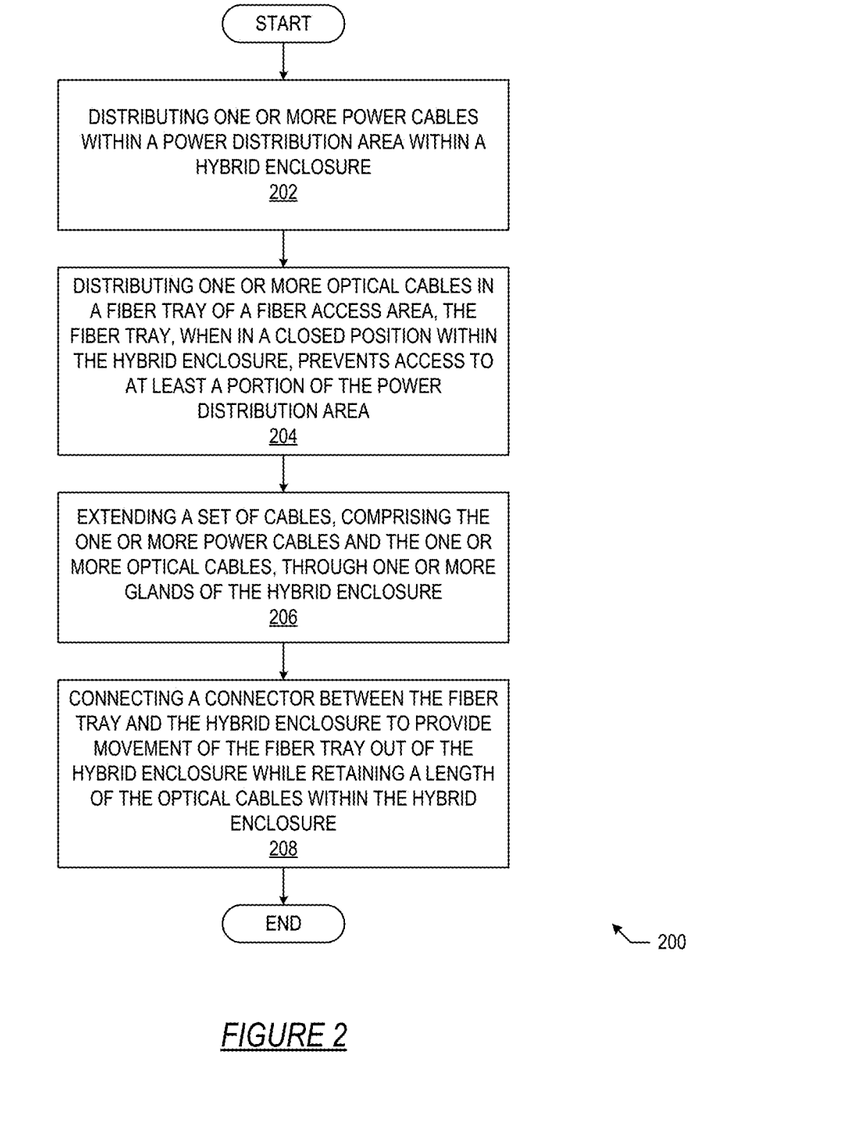
FIG. 2 shows a flowchart in accordance with disclosed embodiments.

Turning to FIG. 2, the process (200) implements manufacture of a hybrid power fiber enclosure.

At Step 202, one or more power cables are distributed within a power distribution area within a hybrid enclosure. The power cables may be part of a trunk cable or component cables received by the hybrid enclosure that electrical power distribute power. For example, the hybrid enclosure may be mounted to a tower and receive the trunk cable. Wires from the trunk cable are connected to wires of the component cables in the hybrid enclosure. The component cables may then be distributed from the hybrid enclosure to communications equipment mounted on the tower.

In one embodiment, the one or more power cables are connected to one or more terminal blocks. In one embodiment, the one or more terminal blocks are connected to one or more surge protection devices. By routing the wires from the trunk cable through the terminal blocks and the surge protection devices, spurious electrical events (power surges, lightening strikes, etc.) may be prevented from damaging the electrical components that are connected to the cables of the hybrid enclosure.

At Step 204, one or more optical cables are distributed in a fiber tray, of the hybrid enclosure. The fiber tray includes a fiber access area. The fiber tray, when in a closed position within the hybrid enclosure, prevents access to at least a portion of the power distribution area. In one embodiment, the fiber tray is movable between the closed position and an open position. In the open position, the power distribution area is accessible in the hybrid enclosure. In one embodiment, the hybrid enclosure, with the fiber tray in the closed position, is covered with a door.

In one embodiment, one or more optical cables are extended from one or more glands to one or more openings of the fiber tray. The optical cables may extend through the power distribution area to reach between the glands and the openings of the fiber tray.

In one embodiment, one or more glands of the hybrid enclosure are disposed at a distal side of the hybrid enclosure. The distal side of the hybrid enclosure may be opposite to a proximal side of the hybrid enclosure, to which the fiber tray is connected.

In one embodiment, one or more optical cables are extended from one or more openings of the fiber tray to one or more optical adapters of the fiber tray. The one or more optical adapters correspond to one or more labels. The labels may identify the optical fibers or connectors from the optical cables that correspond to the optical adapters.

In one embodiment, one or more optical cables are extended from one or more openings of the fiber tray around one or more fiber bend components of the fiber tray. Distributing the optical cables around the fiber bend components of the fiber tray prevents the optical cables from being bent beyond the minimum bend radii of the respective optical fibers.

In one embodiment, a length of the optical cables within the hybrid enclosure is disposed at a proximal side of the hybrid enclosure. The proximal side includes a connector between the fiber tray and the hybrid enclosure. The connector may provide resistance to movement of the fiber tray with respect to the hybrid enclosure. For example, the connector may be a friction hinge that provides enough friction for the fiber tray to remain extended from the hybrid enclosure in the open position without falling to the closed position. The amount of friction is low enough to be overcome by a technician to fold the fiber tray down into the hybrid enclosure and onto the power distribution area.

At Step 206, a set of cables, including the one or more power cables and the one or more optical cables, is extended through one or more glands of the hybrid enclosure. The glands are cable glands that provide for ingress and egress of the cables to and from the hybrid enclosure while protecting the internals of the hybrid enclosure from environmental conditions (e.g., rain, debris, etc.).

At Step 208, a connector is connected between the fiber tray and the hybrid enclosure. The connector provides movement of the fiber tray out of the hybrid enclosure while retaining a length of the optical cables within the hybrid enclosure.

Figure 3A:
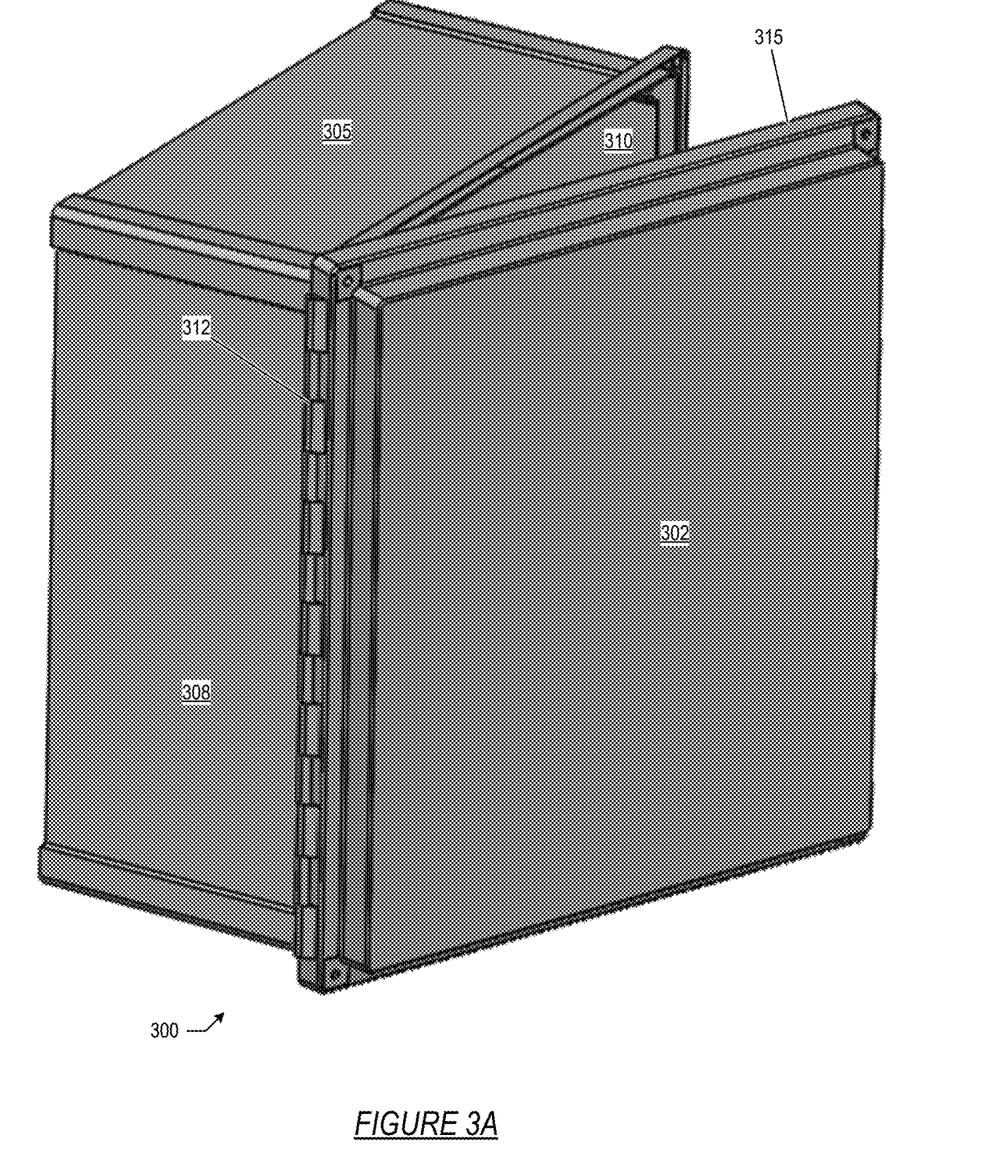
FIG. 3A, FIG. 3B, FIG. 3C, FIG. 3D, FIG. 4A, FIG. 4B, FIG. 5A, FIG. 5B, FIG. 6A, and FIG. 6B show examples in accordance with disclosed embodiments.

Turning to FIG. 3A, the enclosure (300) implements a hybrid power fiber enclosure. The enclosure (300) includes the door (302), the proximal side (305), the adjacent side (308), and the interior (310).

The door (302) is shown partially opened. The door (302) includes the extended edge (315) and is attached using the hinge (312).

The extended edge (315) surrounds the door (302). The extended edge (315) may contain a seal fit to the enclosure (300), when the door (302) is in a closed position.

The hinge (312) connects the door (302) to the adjacent side (308) of the enclosure (300). The hinge (312) may be a friction hinge that resists motion up to a predefined amount of force to maintain an open position of the door (302) with respect to the enclosure (300).

The proximal side (305) is opposite the distal side (337) (of FIG. 3B) of the enclosure (300) through which cables may be routed to the enclosure (300). The proximal side (305) is adjacent to the adjacent side (308).

The adjacent side (308) and the proximal side (305) define a portion of the interior (310). The interior (310) houses additional components within the enclosure (300).

Figure 3B:
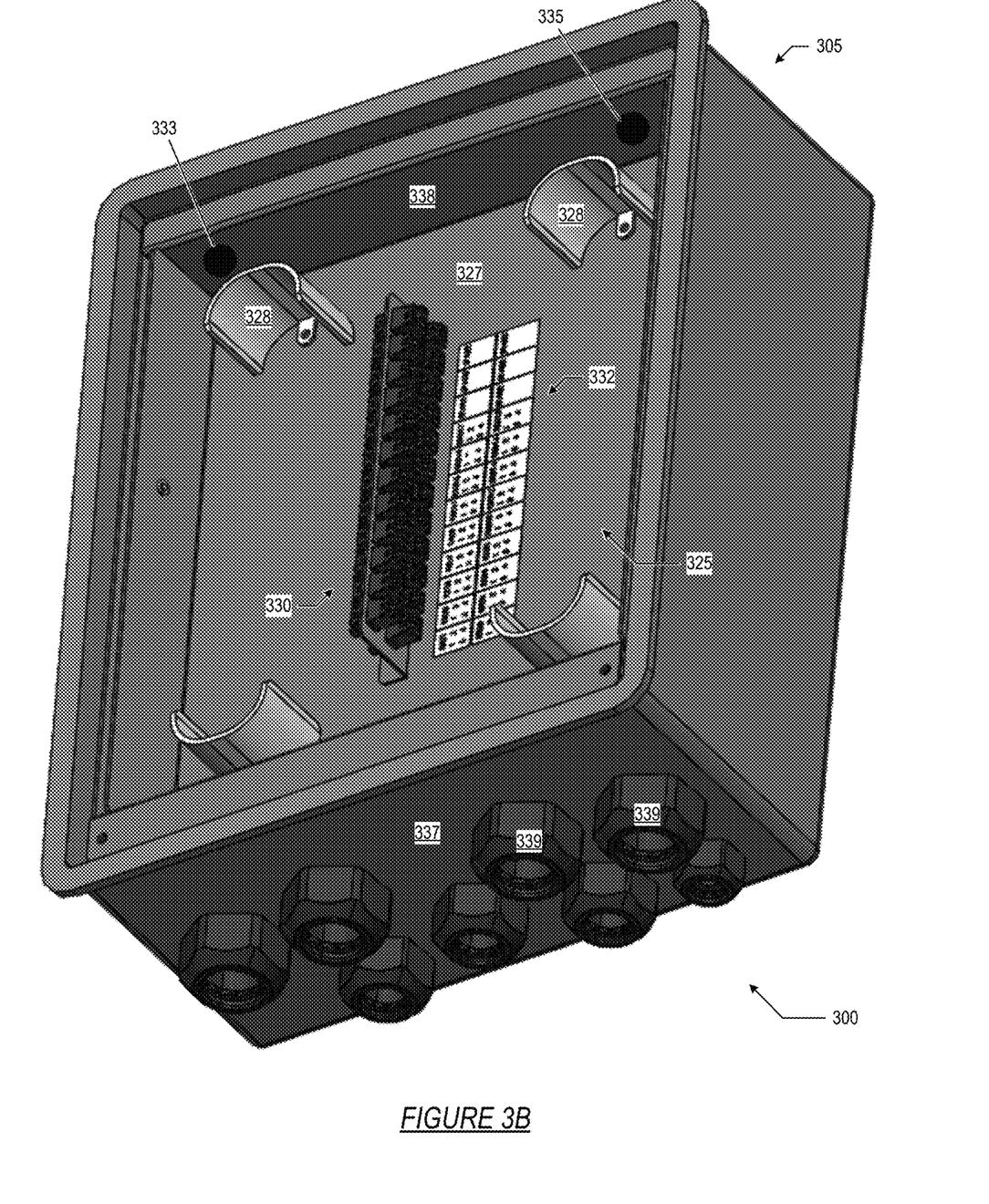
Figure 3C:
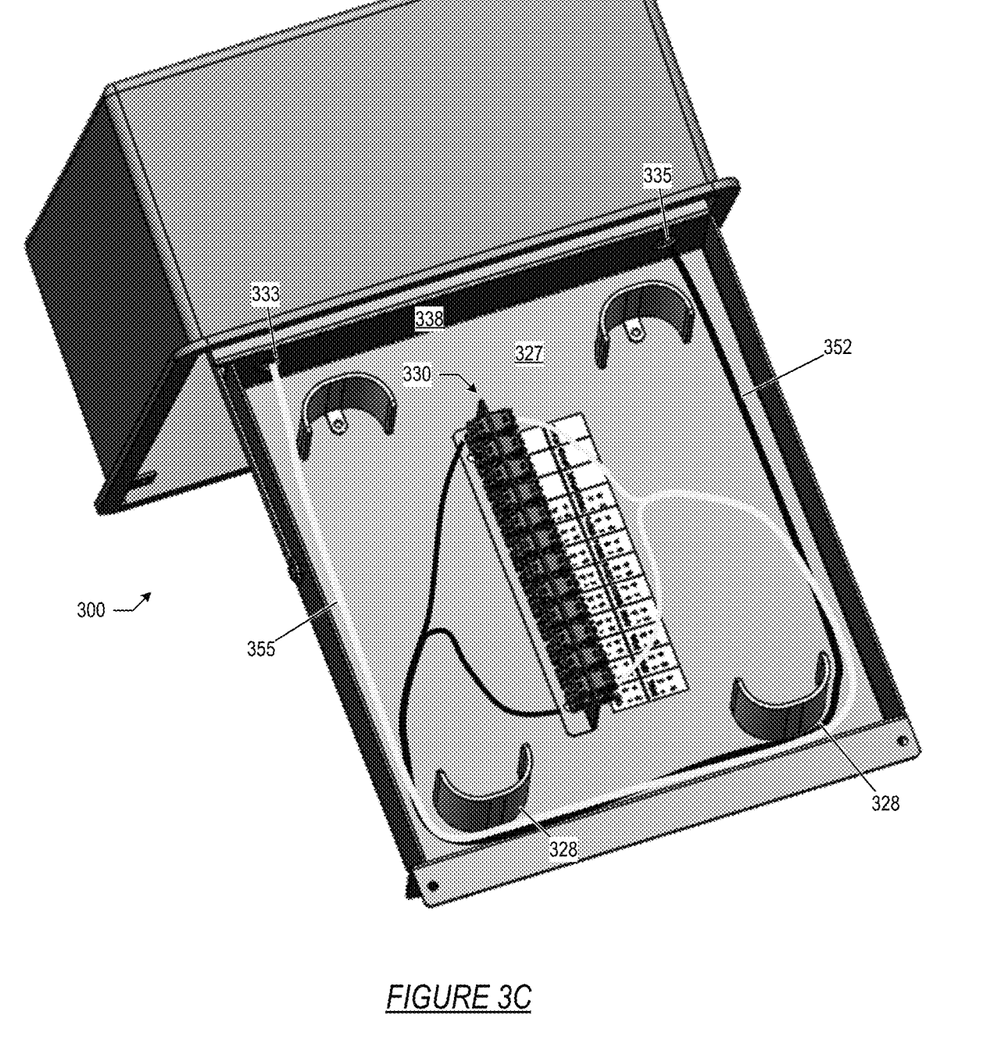
Figure 3D:
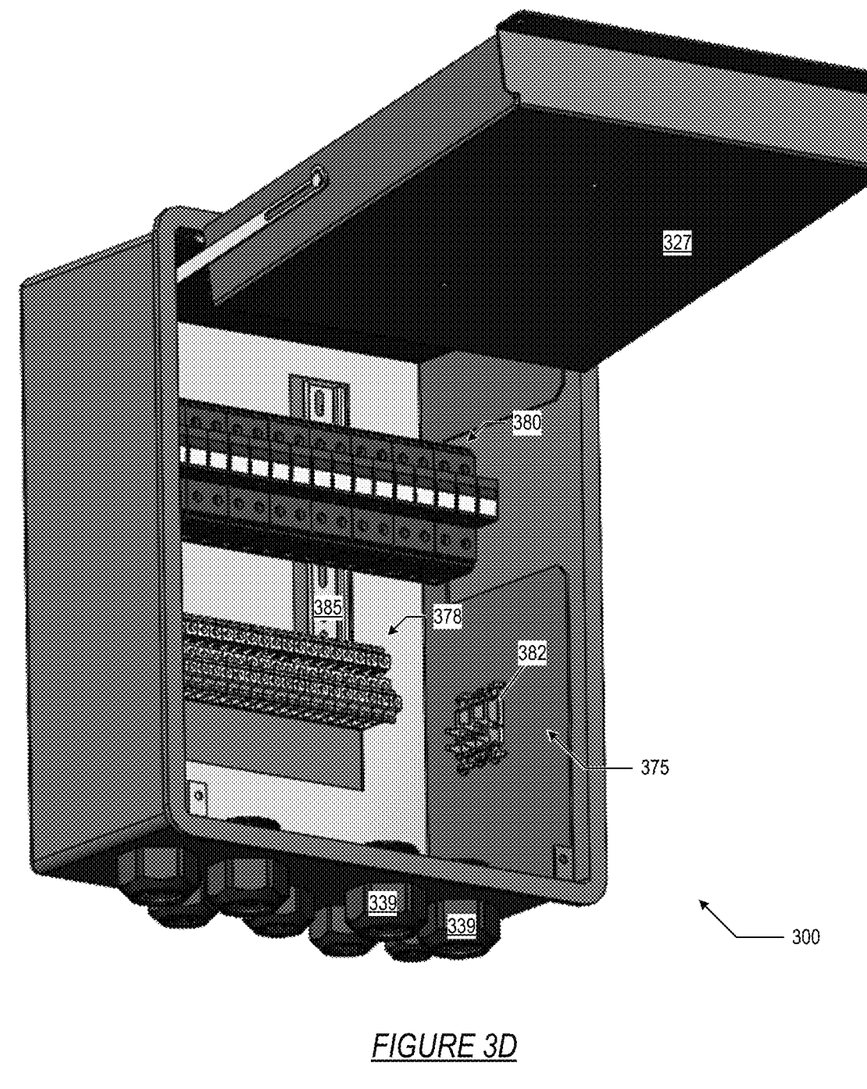

Turning to FIG. 3B, the enclosure (300) is shown with the front door (302) (of FIG. 3A) removed and with the fiber tray (327) of the fiber access area (325) covering the power distribution area (375) (shown in FIG. 3D). The fiber access area (325) is accessible upon opening the enclosure (300) without bending fibers installed to the fiber access area (325).

The fiber access area (325) provides access to optical cables that may be routed within the enclosure (300). The fiber access area (325) is defined by the fiber tray (327).

The fiber tray (327) is made of a rigid material (plastic, metal, etc.) to support several components. The fiber tray (327) includes the openings (333) and (335), the fiber bend components (328), the optical adapters (330), and the labels (332) attached to the fiber tray (327).

The openings (333) and (335) are formed in a proximal side (338) of the fiber tray (327). The proximal side (338) of the fiber tray (327) corresponds to the proximal side (305) of the enclosure (300). After installation, optical cables run through the openings (333) and (335) around the fiber bend components (328) and connect to the optical adapters (330). The opening (333) may be used to route component cables and the opening (335) may be used to route trunk cables.

The fiber bend components (328) are used to support optical cables in the fiber access area (325) and prevent optical cables from being bent beyond the respective minimum bend radii of the optical cables. The fiber bend components (328) include a semi-circular wall and fastening tab. The fiber bent components (328) may be attached to the fiber tray (327) using a faster installed through a respective fastening tab.

The optical adapters (330) connect between optical cables. Each of the optical adapters (330) may be double sided to receive two connectors. Optical signals may pass through the optical adapters (330) from one side to another, e.g., from a fiber of a trunk cable to a fiber of a component cable.

The labels (332) are attached to the fiber tray (327). The labels (332) correspond to the optical adapters (330) and may identify the connectors and fibers attached to the optical adaptors (330).

The distal side (337) is opposite the proximal side (305). The distal side (337) includes the glands (339). The glands (339) protect openings in the enclosure (300) through which trunk cables may be routed into the enclosure (300) and component cables may be routed out of the enclosure (300).

Turning to FIG. 3C, the fiber tray (327) is moved to an open position. The trunk cable (352) is routed from the opening (335) (of the proximal side (338) of the fiber tray (327)), around the fiber bend components (328), and to the optical adapters (330). The component cable (355) is routed from the optical adapters (330), around the fiber bend components (328), and to the opening (333) of the proximal side (338) of the fiber tray (327).

Turning to FIG. 3D, the enclosure (300) is a hybrid fiber panel enclosure. The enclosure (300) includes the power distribution area (375) and the fiber tray (327). The fiber tray (327) is rotatably attached to the enclosure (300) and is rotatable up from the power distribution area (375) to an open position to provide access to the power distribution area (375).

The power distribution area (375) includes the terminal blocks (378) and the surge protection devices (380). Power cables are routed from the glands (339), to the terminal blocks (378), to the surge protection devices (380), back through the terminal blocks (378), and back to the glands (339).

Optical cables are routed through the power distribution area (375) to the fiber tray (327). An optical cable may be routed to a fiber breakout assembly secured to the carrier (382). The fiber breakout assembly may split multiple optical fibers from a cable into multiple breakout cables.

The surge protection devices (380) are juxtaposed with each other and supported by the bracket (385). The terminal blocks (378) include positive and negative terminals that are juxtaposed together and supported by the bracket (385).

Figure 4A:
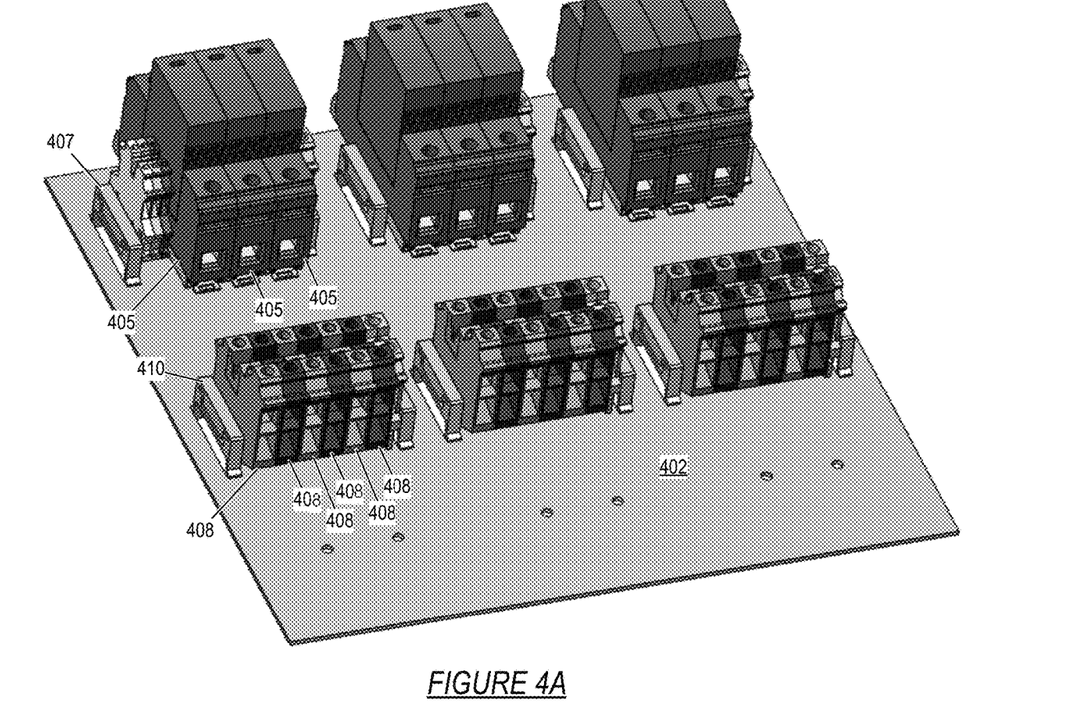

Turning to FIG. 4A, the surge protection devices (405) and the terminal blocks (408) are mounted to a substrate (402). The substrate (402) that may be fitted to a power distribution area within an enclosure.

The surge protection devices (405) and the terminal blocks (408) may be split into any number of groups. The surge protection devices (405) are divided into three groups with each group having three of the surge protection devices (405). The terminal blocks (408) are divided into three groups with each group having six of the terminal blocks (408).

The bracket (407) secures three surge protection devices (405) to the substrate (402). The bracket (410) secures six terminal blocks (408) to the substrate (402).

Figure 4B:
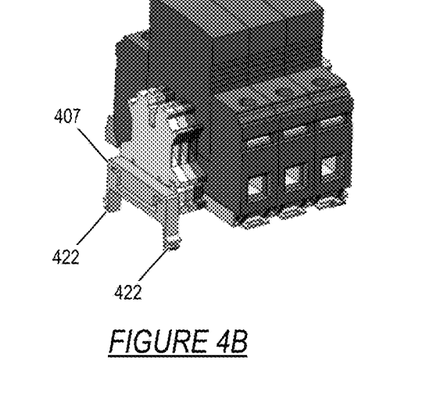

Turning to FIG. 4B, the bracket (407) includes the prongs (422). The prongs (422) are shaped to fit to the substrate (402) of FIG. 4A.

Figure 5A:
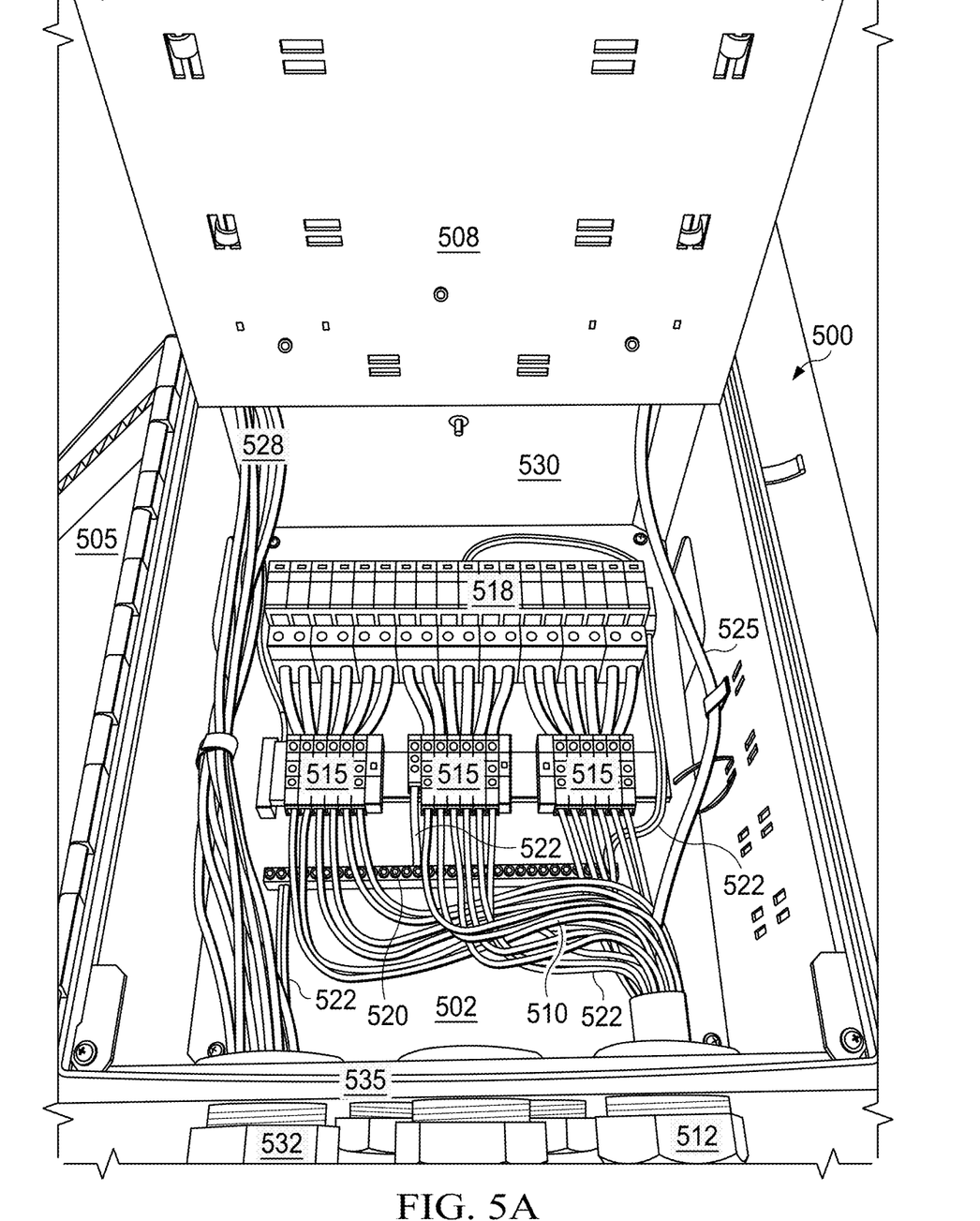

Turning to FIG. 5A, the enclosure (500) includes the power distribution area (502). The power distribution area (502) is accessible when the door (505) is in an open position and the fiber tray (508) is also in an open position. The fiber tray (508) in an open position prevents the door (505) from being moved to a closed position.

The power cables (510) are routed from the gland (512) to the terminal blocks (515). The terminal blocks (515) are wired to the surge protection devices (518). The ground bar (520) is provided and attached to multiple ground wires (522).

The optical cable (525) is a trunk cable that is routed from the gland (512) to the fiber tray (508). The fibers of the optical cable (525) are connected with the fibers of the optical cables (528) in the fiber tray (508) (see FIG. 5B). The optical cables (528) are routed from the proximal side (530) of the enclosure (500) to the gland (532) at the distal side (535) of the enclosure (500).

Figure 5B:
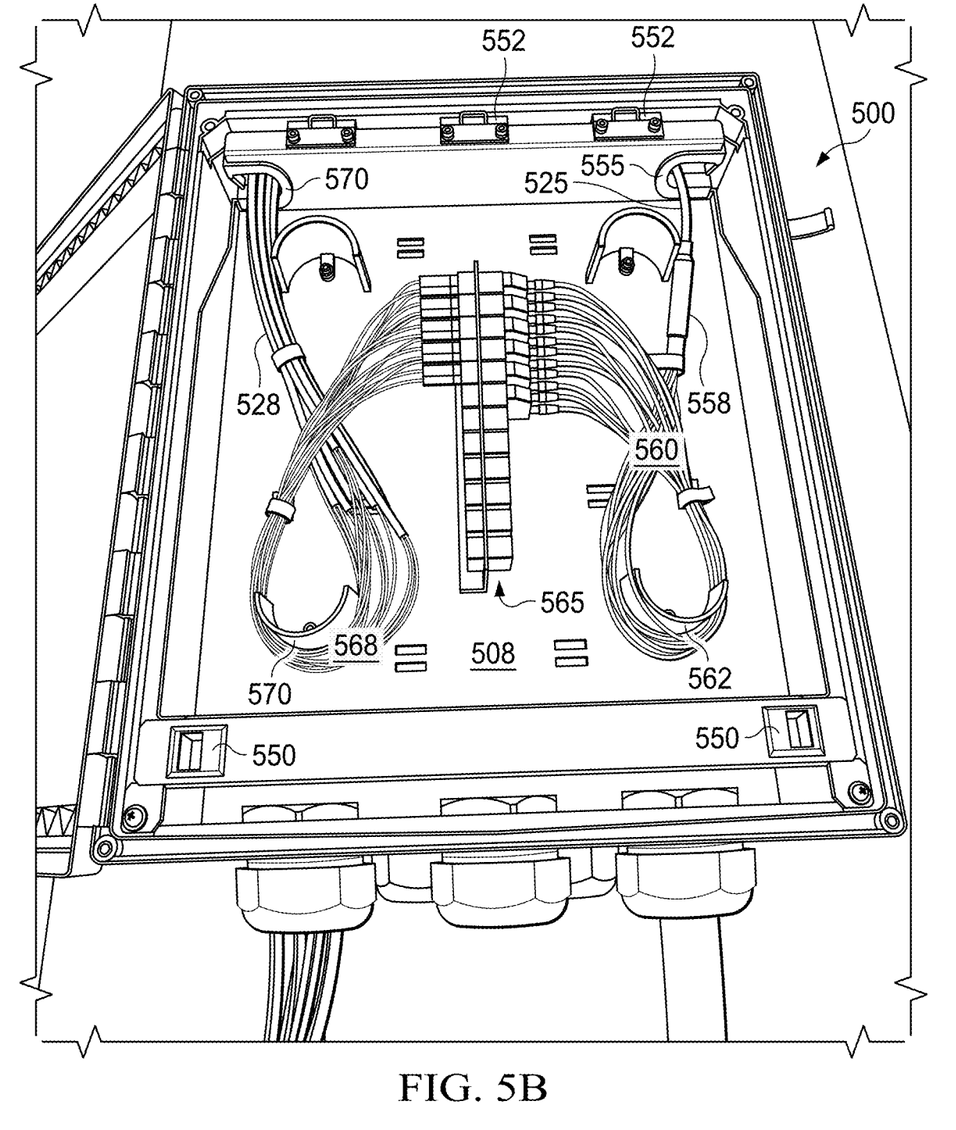

Turning to FIG. 5B, the fiber tray (508) is stored in the closed position within the enclosure (500), preventing access to the power distribution area (502) (of FIG. 5A). The fiber tray (508) may be rotated about the friction hinges (552) to move the fiber tray (508) between the open position (shown in FIG. 5A) and the closed position. The releases (550) prevent transition of the fiber tray (508) from the closed position (shown in FIG. 5B) to an open position (shown in FIG. 5A).

The optical cable (525) is routed from the power distribution area (502) (of FIG. 5A) through the opening (555) to the transition breakout (558). The transition breakout (558) breaks the optical cable (525) out to the optical cables (560). The optical cables (560) are routed around the fiber bend component (562) to the bank of optical adapters (565).

The optical adapters (565) connect between the optical cables (560) and the optical cables (568). The optical cables (568) are routed around the fiber bend component (570). The optical cables (568) are combined and sheathed to form the optical cables (528), which are routed to the power distribution area (502) (of FIG. 5A) through the opening (570).

Figure 6A:
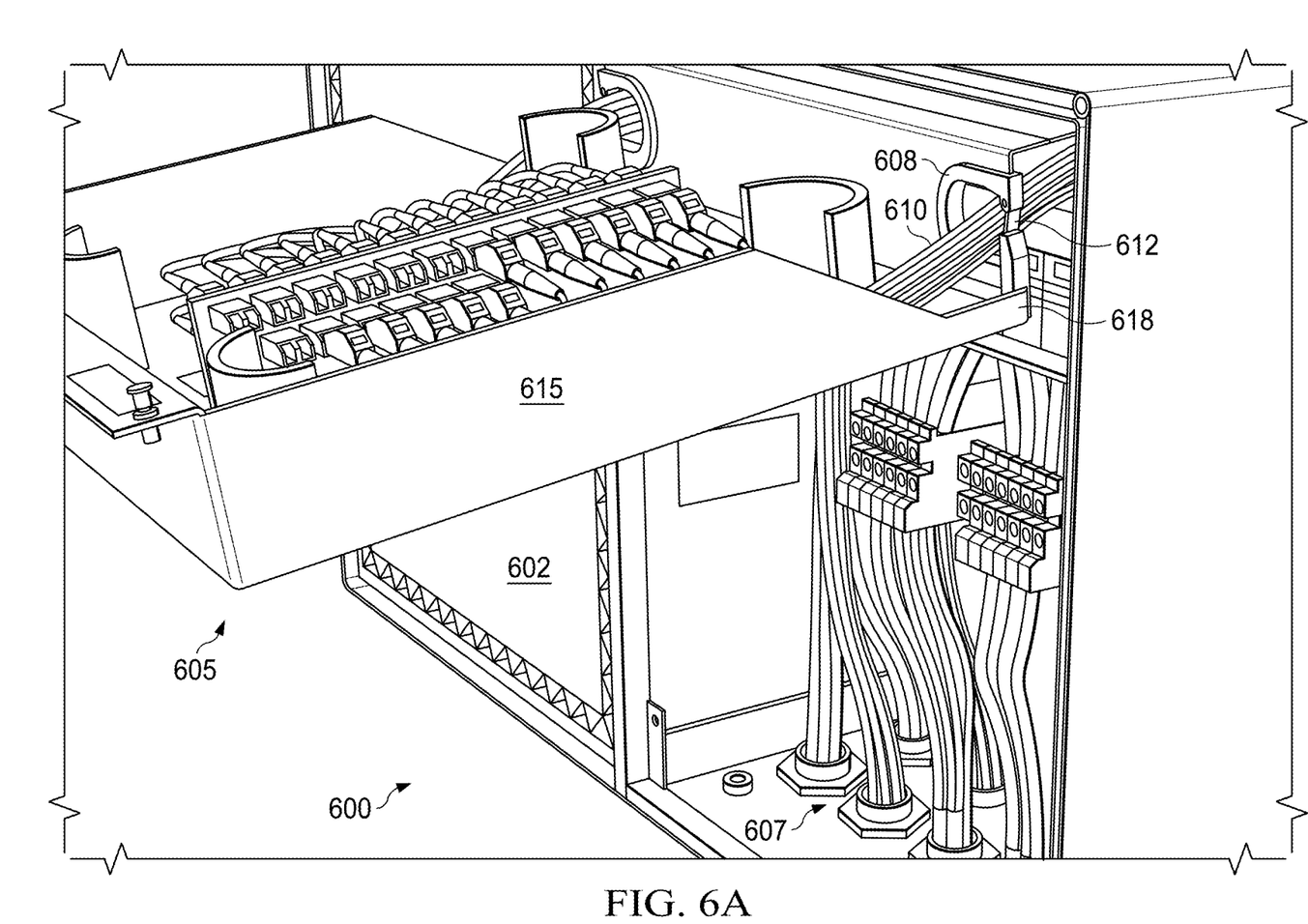

Turning to FIG. 6A, the enclosure (600) has the door (602) in an open position and the fiber tray (605) in an open position. With the fiber tray (605) in the open position, access is available to the power distribution area (607). The fiber tray (605) includes the opening (608) through which the cables (610) are routed.

The opening (608) includes the clip (612), which is biased to a closed position with a spring. The adjacent side (615) of the fiber tray (605) includes the cutout (618).

Figure 6B:
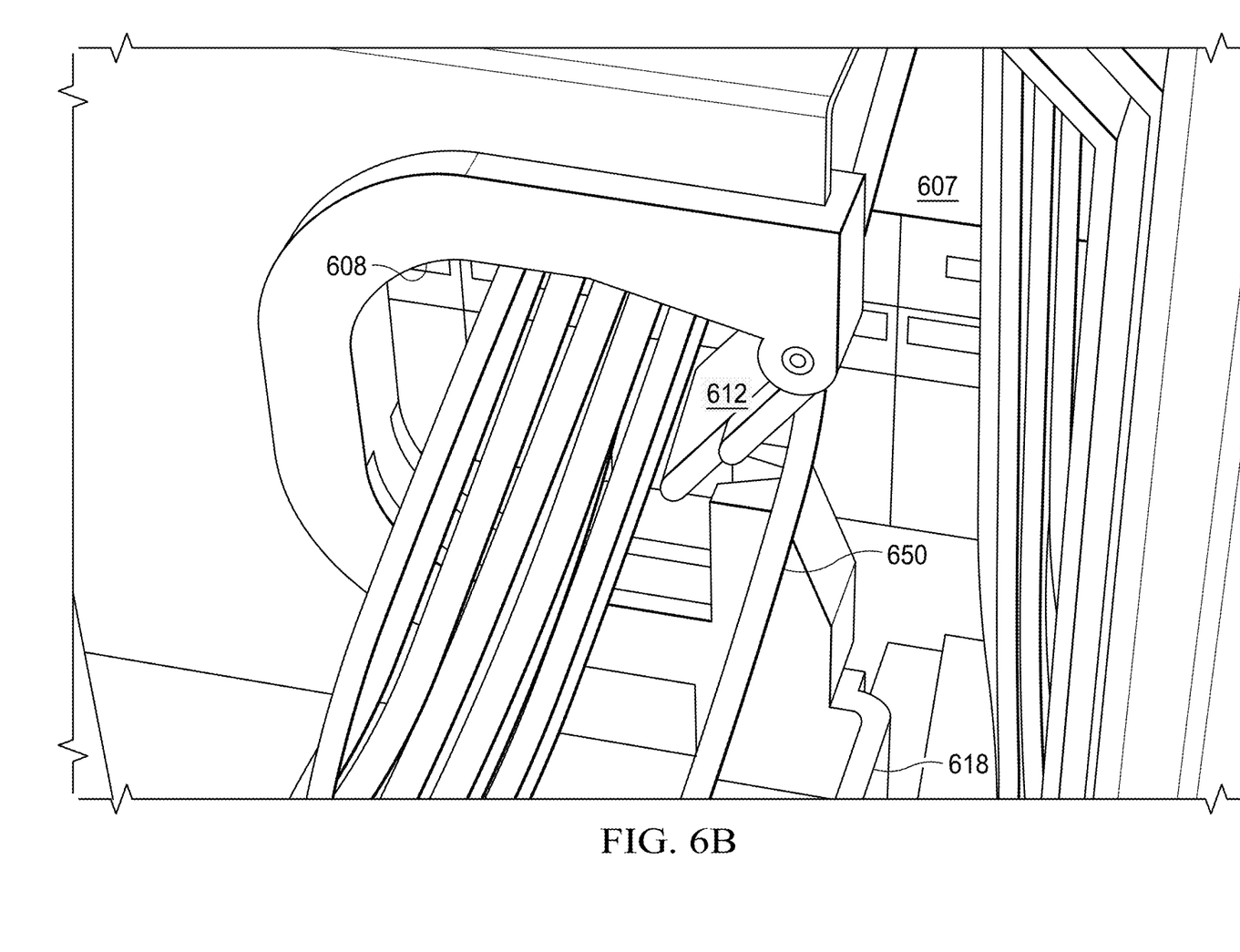

Turning to FIG. 6B, the cutout (618) with the clip (612) on the opening allow the cable (650) to be routed from the power distribution area (607) through the opening (608) without having to pull an end of the cable through the opening. A side of the cable may be pressed through the cutout (618) and the clip (612) into the opening (608) to route the cable (650) through the opening (608).

While the disclosure is described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A hybrid fiber panel enclosure comprising:
    an enclosure comprising:
        a proximal side and an adjacent side that at least partially define an interior of the enclosure; and
        a power distribution area, within the interior of the enclosure, configured to distribute one or more power cables; and
    a fiber tray, rotatably attached to the enclosure at a proximal side of the fiber tray, wherein the fiber tray is rotatable between a closed position within the interior of the enclosure and an open position extending outward from the enclosure, the fiber tray comprising:
        a fiber access area configured to distribute one or more optical cables, wherein the fiber tray, when in a closed position within the enclosure, permits access to the fiber access area and prevents access to at least a portion of the power distribution area; and
        a set of cable openings, positioned to the proximal side of the fiber tray, that enables a set of cables to pass from the power distribution area to the fiber access area.

2. The hybrid fiber panel enclosure of claim 1, further comprising:
    the set of cables, comprising the one or more power cables and the one or more optical cables, extending through one or more glands of the enclosure.

3. The hybrid fiber panel enclosure of claim 2, further comprising:

one or more terminal blocks disposed in the power distribution area and connected to the one or more power cables; and one or more surge protection devices disposed in the power distribution area and connected to the one or more terminal blocks.

4. The hybrid fiber panel enclosure of claim 1, further comprising:

one or more glands disposed at a distal side of the enclosure, wherein the one or more optical cables extend from the one or more glands to one or more of the set of cable openings of the fiber tray.

5. The hybrid fiber panel enclosure of claim 1, further comprising:

the one or more optical cables extending from one or more openings of the fiber tray to one or more optical adapters of the fiber tray, wherein the one or more optical adapters correspond to one or more labels.

6. The hybrid fiber panel enclosure of claim 1, further comprising:

the one or more optical cables extending from one or more openings of the fiber tray around one or more fiber bend components disposed in the fiber tray.

7. The hybrid fiber panel enclosure of claim 1, further comprising:

a door rotatably attached to the adjacent side of the enclosure and configured to cover the interior of the enclosure and the fiber tray in the closed position.

8. The hybrid fiber panel enclosure of claim 1, further comprising:

a connector connected between the fiber tray and the enclosure to provide restricted movement of the fiber tray out of the enclosure while retaining a length of the optical cables within the enclosure.

9. The hybrid fiber panel enclosure of claim 1, wherein a length of the optical cables within the enclosure is disposed at a proximal side of the enclosure, wherein the proximal side of the enclosure comprises a connector between the fiber tray and the enclosure.

10. The hybrid fiber panel enclosure of claim 1, wherein each cable opening of the set of cable openings includes a cutout having a clip biased to a closed position, wherein the cutout facilitates routing a set of cables from the power distribution area to the fiber access area.

11. A method comprising:

distributing one or more power cables within a power distribution area within an interior of an enclosure of a hybrid fiber panel enclosure; and distributing one or more optical cables in a fiber tray rotatably attached to the enclosure at a proximal side of the fiber tray, wherein the fiber tray is rotatable between a closed position within the interior of the enclosure and an open position extending outward from the enclosure, the fiber tray comprising a fiber access area, wherein the fiber tray, when in a closed position within the enclosure, permits access to the fiber access area and prevents access to at least a portion of the power distribution area; and passing a set of cables from the power distribution area to the fiber access area through a set of cable openings positioned to the proximal side of the fiber tray.

12. The method of claim 11, further comprising:
extending the set of cables, comprising the one or more power cables and the one or more optical cables, through one or more glands of the enclosure.

13. The method of claim 11, further comprising:
connecting the one or more power cables to one or more terminal blocks disposed in the power distribution area; and
connecting the one or more terminal blocks to one or more surge protection devices disposed in the power distribution area.

14. The method of claim 11, further comprising:
extending the one or more optical cables from one or more glands, disposed at a distal side of the enclosure, to one or more of the set of cable openings of the fiber tray.

15. The method of claim 11, further comprising:
extending the one or more optical cables from one or more openings of the fiber tray to one or more optical adapters of the fiber tray, wherein the one or more optical adapters correspond to one or more labels.

16. The method of claim 11, further comprising:
extending the one or more optical cables from one or more openings of the fiber tray around one or more fiber bend components disposed in the fiber tray.

17. The method of claim 11, further comprising:
covering the interior of the enclosure, with the fiber tray in the closed position, with a door rotatably attached to an adjacent side of the enclosure.

18. The method of claim 11, further comprising:
connecting a connector between the fiber tray and the enclosure to provide movement of the fiber tray out of the enclosure while retaining a length of the optical cables within the enclosure.

19. The method of claim 1, wherein a length of the optical cables within the enclosure is disposed at a proximal side of the enclosure, wherein the proximal side of the enclosure comprises a connector between the fiber tray and the enclosure.

20. A hybrid fiber panel enclosure comprising:
an enclosure comprising:
a proximal side and an adjacent side that at least partially define an interior of the enclosure; and
a power distribution area, within the interior of the enclosure, configured to distribute one or more power cables; and
a fiber tray, rotatably attached to the enclosure at a proximal side of the fiber tray, wherein the fiber tray is rotatable between a closed position within the interior of the enclosure and an open position extending outward from the enclosure, the fiber tray comprising:
a fiber access area configured to distribute one or more optical cables, wherein the fiber tray, when in a closed position within the enclosure, permits access to the fiber access area and prevents access to at least a portion of the power distribution area; and
a connector connected between the fiber tray and the enclosure to provide restricted movement of the fiber tray out of the enclosure while retaining a length of the optical cables within the enclosure.

* * * * *